US012755007B2

(12) United States Patent
Soryal

(10) Patent No.: US 12,755,007 B2
(45) Date of Patent: Oct. 6, 2026

(54) BROWSER IN THE BROWSER ATTACK PROTECTION EMPLOYING ARTIFICIAL INTELLIGENCE

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 199 days.

(21) Appl. No.: 18/194,102

(22) Filed: Mar. 31, 2023

(65) Prior Publication Data

US 2024/0330444 A1 Oct. 3, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ............. G06F 21/554; G06F 2221/034; H04L 63/083; H04L 63/0236; H04L 63/0407; H04L 63/10; H04W 12/068
See application file for complete search history.

(56) References Cited

U.S. PATENT DOCUMENTS 8,869,279 B2 * 10/2014 Shulman ................. H04L 67/02 726/25
9,256,727 B1 * 2/2016 Manmohan ............. G06F 21/55
2012/0324568 A1 * 12/2012 Wyatt ................. H04W 12/128 726/13
2014/0181629 A1 * 6/2014 Hey ........................ G06F 3/048 715/230
2014/0189808 A1 * 7/2014 Mahaffey ............ G06F 21/6245 726/4
2017/0346851 A1 * 11/2017 Drake .................. H04L 9/0838
2019/0104154 A1 * 4/2019 Kumar ................... G06N 20/00
2021/0365539 A1 * 11/2021 Fiske .................... H04L 9/3066
2022/0030029 A1 * 1/2022 Kagan ................. H04L 63/1483
2023/0010945 A1 1/2023 Soryal et al.
2023/0362164 A1 * 11/2023 Benko .................. H04L 9/3073

OTHER PUBLICATIONS

Varshney et al., Browshing (a new way of phishing using a malicious browser extension), 2017, IPACT (Year: 2017).*

(Continued)

*Primary Examiner* — Philip J Chea
*Assistant Examiner* — Jasmine Mochen Day
(74) *Attorney, Agent, or Firm* — Guntin & Gust, PLC; Erik Boyd

(57) ABSTRACT

Aspects of the subject disclosure may include, for example, capturing an image of information displayed on a display screen of the device, identifying in the image a pop-up, the pop-up prompting entry of user credentials of a user for an authenticator website, the pop-up generating an authorization request from the device to the authenticator website, identifying in the image a network address for a target website, and communicating with the authenticator website at the network address for verification of the authorization request. Other embodiments are disclosed.

20 Claims, 10 Drawing Sheets

200

215

(56) References Cited

OTHER PUBLICATIONS

Louw et al., Enhancing web browser security against malware extensions, 2007 (Year: 2007).*
Badra et al., Phishing Attacks and Solutions, 2007 (Year: 2007).*
Utakrit, Review of Browser Extensions, a Man-in-the-Browser Phishing Techniques Targeting Bank Customers, 2009 (Year: 2009).*
Website Spoofing, 6 pgs.
"Example Flow", https://www.oauth.com/oauth2-servers/server-side-apps/example-flow/, 5 pgs.
"Wikipedia Single Sign-On", https://en.wikipedia.org/wiki/Single_sign-on, 6 pgs.
Goodin, Dan , "Behold, a password phishing site that can trick even savvy users", https://arstechnica.com/information-technology/2022/03/behold-a-password-phishing-site-that-can-trick-even-savvy-users/, Mar. 21, 2022, 9 pgs.
Raible, Matt , "What the Heck is OAuth?", https:developer.okta.com/blog/2017/06/21/what-the-heck-is-oauth, Jan. 21, 2017, 26 pgs.

* cited by examiner

100

200

215

300

600

BROWSER IN THE BROWSER ATTACK PROTECTION EMPLOYING ARTIFICIAL INTELLIGENCE

FIELD OF THE DISCLOSURE

This disclosure relates generally to security for data processing systems. More particularly, this disclosure relates to protection against Browser-in-The-Browser attacks and similar security risks on a user device.

BACKGROUND

A Browser-in-the-Browser (BiTB) attack is a technique for unauthorized persons to obtain data and personal information such as login credentials for accessing a web site. In a BiTB attack, a login window is simulated with a spoofed domain within a parent browser. The login window may be intended to improperly obtain a user's login credentials.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for verification of a connection to a legitimate webpage when a user device such as a mobile device or personal computer attempts to access the webpage. A background process detects a pop-up displayed on a device screen and a network address and contacts the network address to verify an authorization process. Other embodiments are described in the subject disclosure.

One or more aspects of the subject disclosure include capturing an image of information displayed on a display screen of the device, identifying in the image a pop-up, the pop-up prompting entry of user credentials of a user for an authenticator website, the pop-up generating an authorization request from the device to the authenticator website, identifying in the image a network address for a target website, and communicating with the authenticator website at the network address for verification of the authorization request.

One or more aspects of the subject disclosure include in the background process on a user device, from time to time capturing a screenshot of an image displayed by a web browser on a display screen of the user device, analyzing the screenshot of the image to identify a network address for a target website to be accessed by the web browser, identifying an authenticator website to be used to provide access credentials for access to the target website by the web browser, and communicating with the authenticator website to verify an authentication request, the authentication request seeking authentication in a foreground process of the processing system to access the target website.

One or more aspects of the subject disclosure include identifying an attempt by a web browser operating on the processing system to interact with a website over a network, wherein the attempt to interact with the website over the network is based on a network address of the web browser for the website, communicating with the website including inquiring if the website has received the attempt by the web browser to interact with the website, wherein the inquiring is based on the network address of the web browser for the website, and receiving an indication from the website confirming that the website has received the attempt by the web browser to interact with the website.

Figure 1:
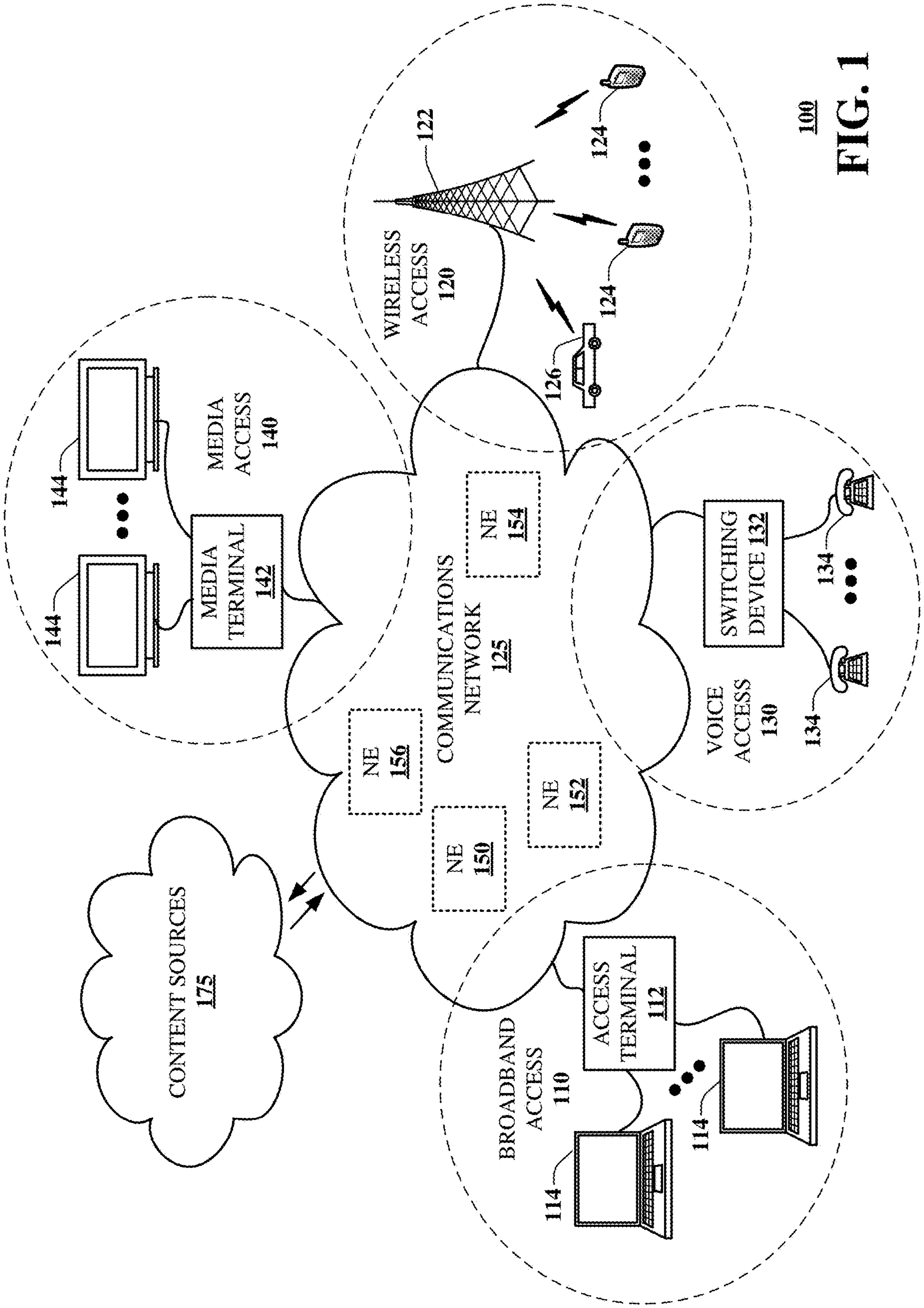
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part verifying legitimacy of a website or webpage in a background process as a user device attempts to interact with the website or webpage. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
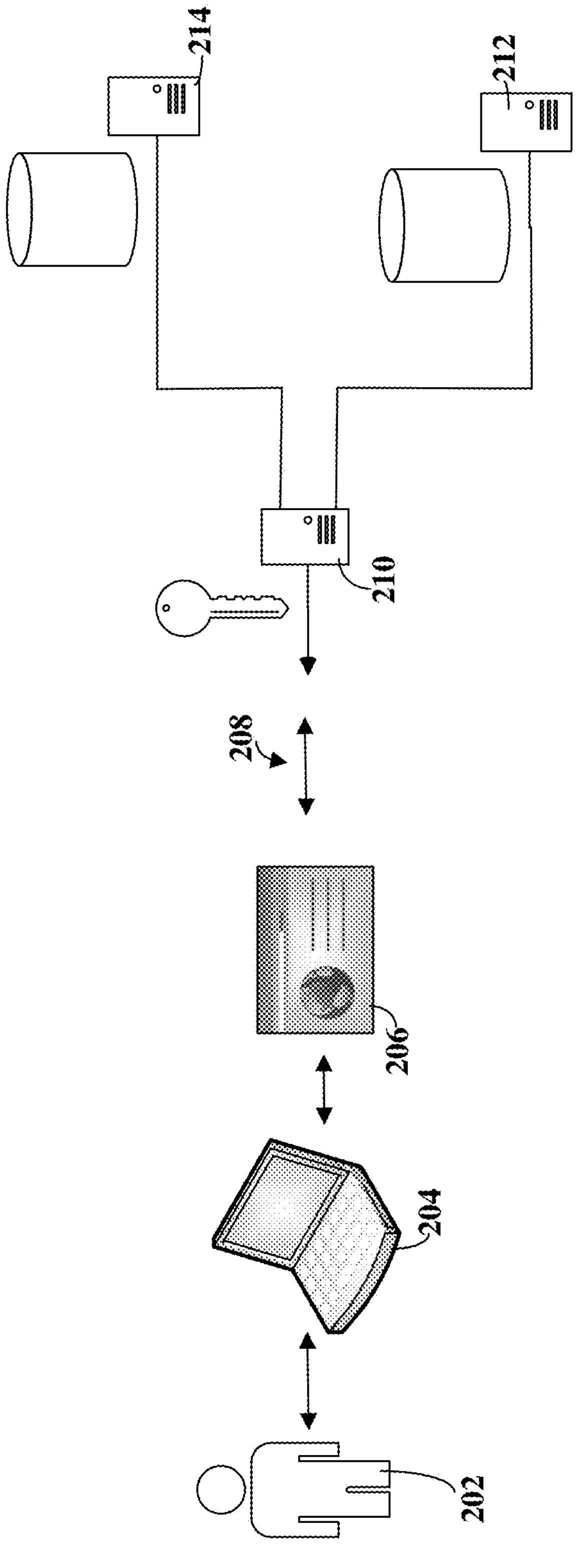
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communications network 125 of FIG. 1 in accordance with various aspects described herein. The system 200 illustrates an example embodiment of a user 202 operating a data processing system such as personal computer 204 to access a web server 210 over a network 208. The web server 210 is in data communication in this example with an authorization server 212 and a resource server 214. For example, the user 202 and personal computer 204 may be in data communication with broadband access 110 of FIG. 1 via access terminal 112 or through any suitable data connection. In other examples, the personal computer may interact with the wireless access 120 or media access 140 to obtain network access to the network 208. The web server 210 may be implemented on a network element such as network element 150 or may be provided by another data processing device accessed by the user 202 and personal computer 204 over another network.

In some aspects of operation, the user 202 interacts with a browser 206 on the personal computer 204. The personal computer 204 may be any suitable data processing device including a desktop computer, a mobile device such as a tablet computer or mobile phone. The personal computer 204 includes a user interface which may include a display, a keyboard and other devices for display and entry of information by the user 202. The user interface enables user interaction with the browser 206. The personal computer further includes a communication interface providing wireline, wireless or both access for data communication to one or more networks such as network 208. The communication interface allows the browser 206 to interact with other services such as websites over the network 208.

The browser 206 is displayed on the display of the personal computer. The browser 206 generally is a computer program operating on the personal computer 204 and providing a graphical user interface for displaying and navigating between web pages on the personal computer 204. The browser 206 may be used to locate and display and interact with information on a network such as the public internet or a private intranet. In exemplary embodiments, the user 202 may direct the browser to a particular website defined by a uniform resource locator (URL) and provide personal information of the user such as login credential to access web pages and other features of the website.

A Browser-in-the-Browser (BiTB) attack is a technique for unauthorized persons to obtain data and personal information such as login credentials for accessing a web site. In a BiTB attack, a login window is simulated with a spoofed domain within a parent browser such as browser 206. The login window is intended to improperly obtain a user's login credentials such as an email account and a password. It is a type of attack known as phishing. Phishing is a fraudulent practice of sending emails or other messages purporting to be from a reputable source in order to induce individuals to reveal personal information such as login credentials for a website or credit card numbers.

A BiTB attack takes advantage of a single sign-on (SSO) option provided by some third parties. Single sign-on is an authentication scheme that allows a user such as the user 202 to log in with a single set of identification credentials to more than one related yet independent websites or systems. SSO allows the user 202 to log on to multiple websites simultaneously.

In an example, the user 202 signs up for a new service or a new website using web browser 206 on personal computer 204 accessing the website over the network 208. The user 202 is presented via the browser 206 with an option to sign up for the new service or the new website by creating a new account and connecting the new account to an existing account such as the user's Google account or Apple account. Using SSO, the login process is straightforward. The user chooses a third-party service to log in with and clicks on a designated on-screen link such as a Sign-Up button. A new browser window is displayed as a pop up for the user to log in with user credentials for that third-party service, such as Google or Apple. After the login is successful and the credentials are verified, the user's new account on the new site is created. The SSO process is offered in place of manual, individual sign-up to the new service or website with, for example, an email address and password. A BiTB attack thus simulates a login window within a browser window to steal user credentials.

In examples, BiTB uses OAuth protocols. OAuth protocols may be used to collect information from the user. OAuth is a tool for collecting protected data from an application. OAuth does not share password data but instead uses authorization tokens to prove an identity between a user and service provider. OAuth is an authentication protocol that allows a user such as user 202 to approve one application interacting with another application on behalf of the user without disclosing the password or other confidential information of the user.

Figure 2B:
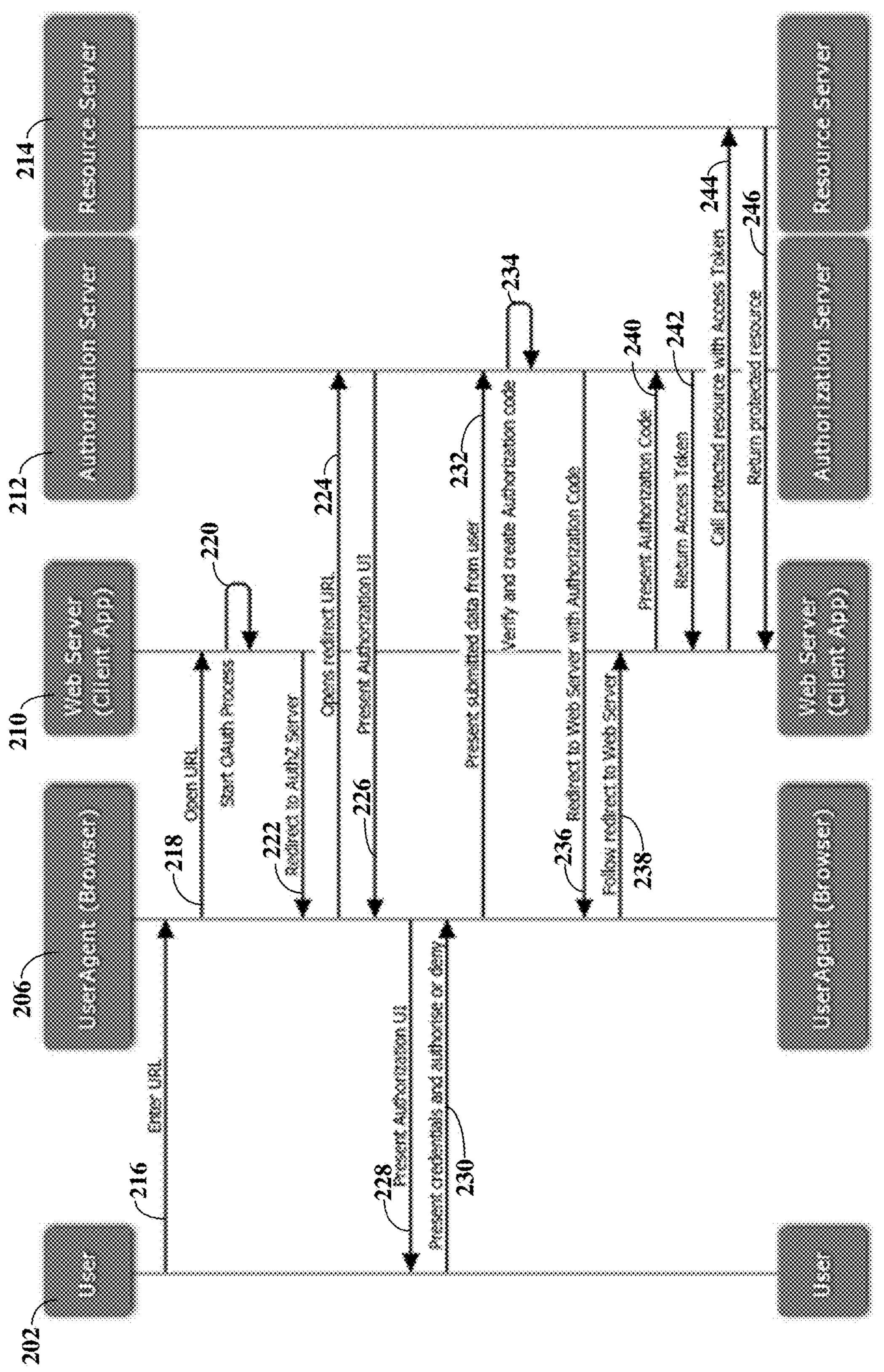
FIG. 2B depicts an illustrative embodiment of a method for accessing a website or web service using OAuth protocols in accordance with various aspects described herein.

FIG. 2B depicts an illustrative embodiment of a method 215 for accessing a website or web service using OAuth protocols in accordance with various aspects described herein. At step 216, the user 202 enters identifying information such as a URL into the browser 206. At step 218, the browser 206 contacts the web server 210 and opens the web page corresponding to the URL. At step 220, the OAuth process is initiated. In this example, the web server 210 or client application corresponds to the new service or web page with which the user 202 seeks to establish a new account.

At step 222, the web server 210 communicates a redirect message to the browser 206, redirecting the browser 206 to the authorization server 212. The redirect message may include a URL for the authorization server or for an authentication function provided by the authorization server. The authorization server 212 may correspond to a known service of agent with which the user 202 already has in place a user account, such as Google or Facebook.

At step 224, the browser 206 opens the URL corresponding to the authorization server received in the redirect message from the web server 210. At step 226, the authorization server presents an authorization user interface to the browser 206. The authorization user interface may include any suitable information to be displayed on the browser 206 to invite the user 202 to activate the authorization process. For example, text such as "Activate using your Google account" may be presented in the authorization user interface, along with one or more links to continue the authorization process. Further, the authorization user interface may include the login credentials associated with the user 202. The login credentials may be retrieved from the authorization server based on the preexisting account of the user 202 with the service such as Google or Facebook. The login credentials of the user may be displayed visibly to the user 202 on the authorization user interface or may be kept confidential and not displayed.

At step 228, the browser 206 presents the authorization user interface to the user 202. This is done, for example, by displaying text and graphics on the display of the personal computer 204 (FIG. 2A) and waiting for the user 202 to provide input to the personal computer, such as by mouse activation, touch screen activation or keyboard entry. At step 230, the user presents credentials such as am e-mail address and password, Further, the user either authorizes sharing the user credentials retrieved from the authorization server 212 or denies the activation of the authorization process.

At step 232, the browser 206 presents to the authorization server 212 the data submitted from the user at step 230. At step 234, the authorization server verifies the user data and creates an authorization code. Verification of the user data includes confirming that the login credentials received from the user at step 230 match login credentials on file with the authorization server 212.

At step 236, the authorization server 212 provides a redirect message to the browser 206. The redirect message may include a URL for further authorization as well as the authorization code generated at step 234. At step 238, the browser 206 responds to the redirect message and contacts the web server 210 associated with the new web page or web service of interest to the user 202. At step 240, the web server 210 presents the authorization code to the authorization server 212. If the authorization code matches the authorization code generated at step 234, the authorization server 212 returns an access token to the web server, step 242. At step 244, the web server 210 contacts a protected resource, resource server 214, with the access token. At step 246, the resource server 214 returns the protected resource, completing the registration process with the application on the web server 210.

Figure 2C:
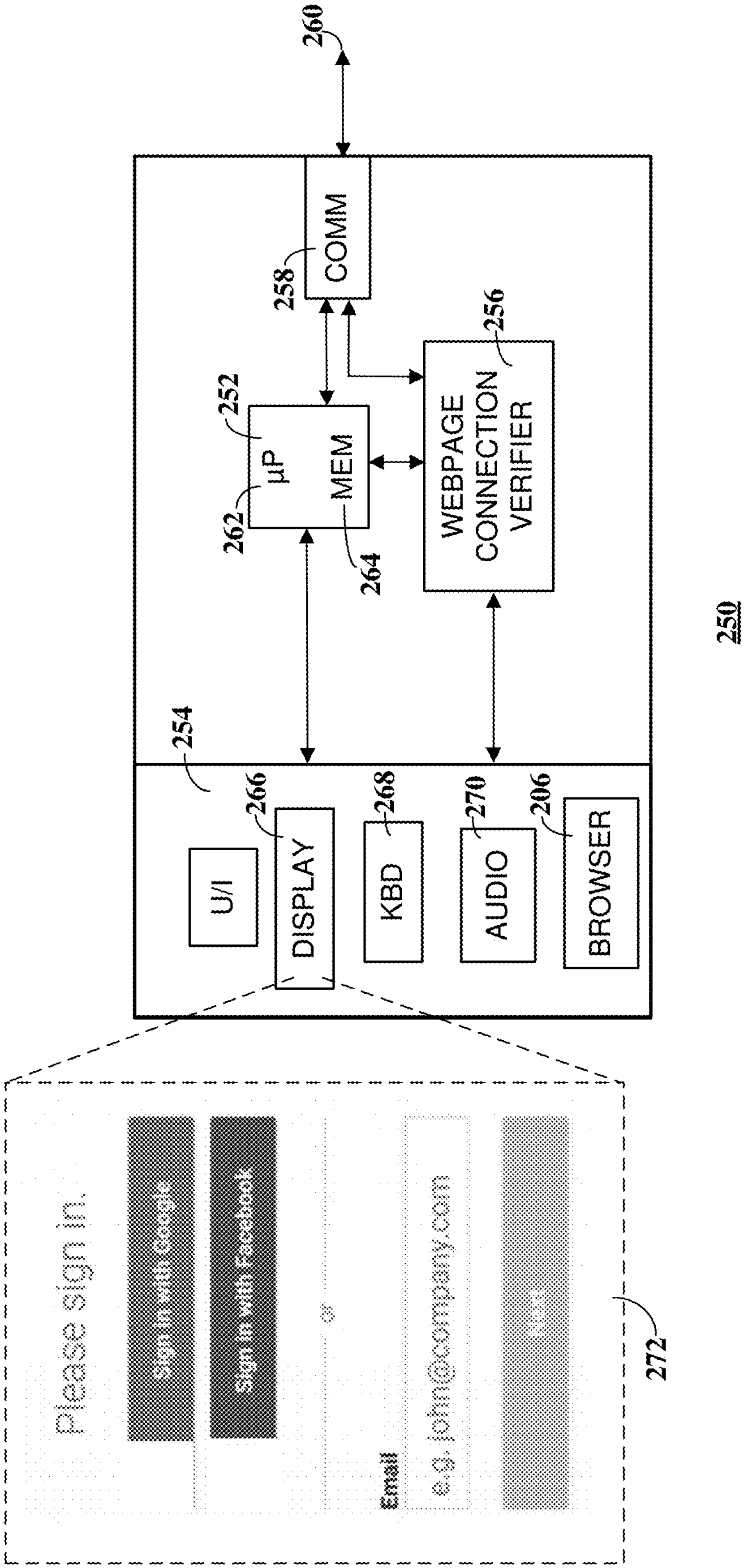
FIG. 2C is an illustrative embodiment of a block diagram of a data processing system in accordance with various aspects described herein.

FIG. 2C is an illustrative embodiment of a block diagram of a data processing system 250 in accordance with various aspects described herein. The data processing system 250 may be embodied as any type of data processing system which provides network access and local processing for a user such as the user 202 of FIG. 2A. In embodiments, the data processing system may include a personal computer such as personal computer 204 of FIG. 2A, data terminals 114, mobile devices 124, or vehicle 126 of FIG. 1.

In the exemplary embodiment, the data processing system 250 includes a processing system 252, a user interface 254, a webpage connection verifier (WCV) 256, a communications interface 258 which may exchange data with a network 260. The processing system includes one or more processors such as microprocessor 262 and memory such as memory 264. The user interface 254 in embodiments includes a for generating a visual display to the user, a keyboard 268 for receiving text and other input information from the user, an audio processing system 270 including a speaker for providing audio to the user and a microphone for collecting speech and other audio from the user, and browser 206. The display device 266 may include a touchscreen display for sensing user interactions with the screen. The user interface 254 may include a mouse interface for sensing mousing commands of the user. The communication interface 258 provides data communication between the data processing system 250 and the network. Such communication may be wireless or wireline and according to any suitable standard such as 5G cellular, Wi-Fi, Bluetooth, Ethernet, and others. For example, the communication interface may provide access over the public internet to webpages and websites of interest to the user.

The WCV 256 is in data communication with the processing system 252, the user interface 254 and the communication interface 258. The WCV 256 may be implemented as a software module, for example, located in any suitable storage location such as the memory 264 of the processing system. In other examples, the WCV 256 may include at least some hardware components combined with software to provide necessary functionality.

In embodiments, the WCV 256 may be a standalone module as illustrated in FIG. 2C or may integrated with commercial antivirus software. Antivirus software is a program or set of programs that are designed to prevent, search for, detect, and remove software viruses and other malicious software from a data processing system such as data processing system 250. Malicious software may include functional items in code such as worms, trojans, adware, and more. Typically, antivirus software operates to scan specific files or directories for any malware or known malicious patterns, schedule automatic scans of files or directories, remove any malicious code, etc.

In embodiments, the WCV 256 operates to visually inspect information displayed on the display device 266 of the data processing system 250 during operation of the data processing system 250. The goals of the WCV 256 include detecting and thwarting a BiTB attack on the data processing system and alerting the user. In general, all connections by the communications interface 258 are encrypted using, for example, hypertext transport protocol-secure (HTTPS). HTTPS is a secure version of hypertext transport protocol and is used to send data between a web browser such as web browser 206 and a website. HTTPS is encrypted in order to increase security of data transfer. Because of the encryption of outgoing data generated by the browser 206 for transmission over the network 260 and incoming data received over the network 260 for delivery to the browser 206, no other application can read information such as a universal resource locator (URL), network address or destination identifier that the browser 206 is trying to reach. This is true of antivirus software active on the data processing system 250 as well.

As discussed in connection with FIG. 2B, a website or web service may be accessed using OAuth protocols. OAuth is an open standard for authorization on internet sites. OAuth is a standard that applications operating in conjunction with a web browser can use to provide client applications with secure delegated access. OAuth works over a hypertext transfer protocol-secure (HTTPS) connection and authorizes devices, application programming interfaces (APIs), servers, and applications with access tokens rather than credentials. OAuth is a delegated authorization framework for applications and APIs. OAuth in some embodiments has multiple versions. OAuth is one example of a delegated authorization framework or mechanism. Delegated authentication links the user's identity across multiple identity and access management (IAM) systems. The delegation aspect in delegated authentication simply means that the user's apps rely on another platform, known as an identity provider (IdP), to verify the user's login credentials.

One aspect of OAuth is display of a pop-up such as pop-up 272 which shows a browser in a browser arrangement. A pop-up is a window that appears in the user interface 254 without an intentional action from the user. A browser window such as pop-up 272, is displayed with other information or content in the browser 206 on the display device 266 of the user interface 254. The browser in a browser arrangement of pop-up 272 indicates use of OAuth protocols and a risk of a BiTB attack. The particular pop-up 272 illustrated in FIG. 2C is intended to be exemplary only.

A second aspect of the user of OAuth is the uniform resource locator (URL) or other network address information with which the browser seeks to communication. However, as indicated, the data forming the pop-up 272 and the URL are encrypted outside of the browser and so are invisible or unreadable to other components of the data processing system 250.

Accordingly, the WCV 256 takes screen shots of the image displayed on the display device 266 from time to time. The WCV 256 monitors the activity of the display device 266 and can selectively capture and store the data forming the displayed image. A screenshot may also be referred to as a screencap or screengrab. A screenshot is an image that shows the contents of the display device 266. The screenshot captures exactly what the user is seeing at the moment the screenshot is taken. The data forming the screenshot can be saved and processed and referenced subsequently.

The WCV 256 may take screenshots according to any schedule or time frame. This may be done periodically, such as once per second or once per 30 seconds, or at any other period. This may be done in response to any suitable trigger, such as detection of operation of the communication interface 258. For example, in many applications, communications are inactive, and operation is solely internal for an extended time. Once data begins to be transmitted or received over the network 260 by the communications interface 258, the WCV may become active to monitor information taken on the display device 266.

In some embodiments, the WCV includes an artificial intelligence module which can include a graph to text module and a memory. In other embodiments, the artificial intelligence module performs an image recognition comparable to optical character recognition (OCR). The artificial intelligence module operates to identify either a browser in the browser arrangement, such as pop-up 272 or other arrangement indicating a BiTB attack or unauthorized attempt to obtain user credentials. Thus, the WCV 256 does not analyze the contents of the image captured from the entire display screen.

The WCV 256 analyzes the URL of the page as displayed on the display screen and any pop-up 272 that may be present on the display screen. By converting the image of the URL to text data, the artificial intelligence module may analyze the text of the URL to identify an attack on the data processing system 250. For example, website spoofing is the act of creating a website with the intention of misleading users that the website has been created by a different person or organization. Normally, the spoof website adopts the design of the target website and it sometimes has a similar URL.

In embodiments, the WCV 256 has a memory storing a database of most-visited websites that a user might be trying to legitimately access. The artificial intelligence module may compare the URL of the page with contents of the database of most visited websites which are known-good websites. The artificial intelligence module of the WCV 256 may operate to check for typographical errors in the URL which may lead to a spoofed website. The BiTB attack may try to emulate a legitimate website through a slight misspelling or mis-rendering of a website name or URL, such as g00gle, substituting zeroes for the letter O in the name of the search engine operated by Google, or chasee.com, adding an extra letter E to the URL of a bank name. Such misspellings may correspond to a spoofed website. In the event a spoofed website is detected, an alert is shown to the user advising of the BiTB attack.

In some embodiments, the WCV 256 contacts the website that is indicated in the URL or in the pop-up (e.g., google.com, facebook.com, etc.) and that is used to sign in the user to a third website and verifies the session. For example, the user tried to access a website having URL xyz.com. Such as website may have a pop up for the user to sign with credentials from the user's existing Google or Facebook account.

Figure 2D:
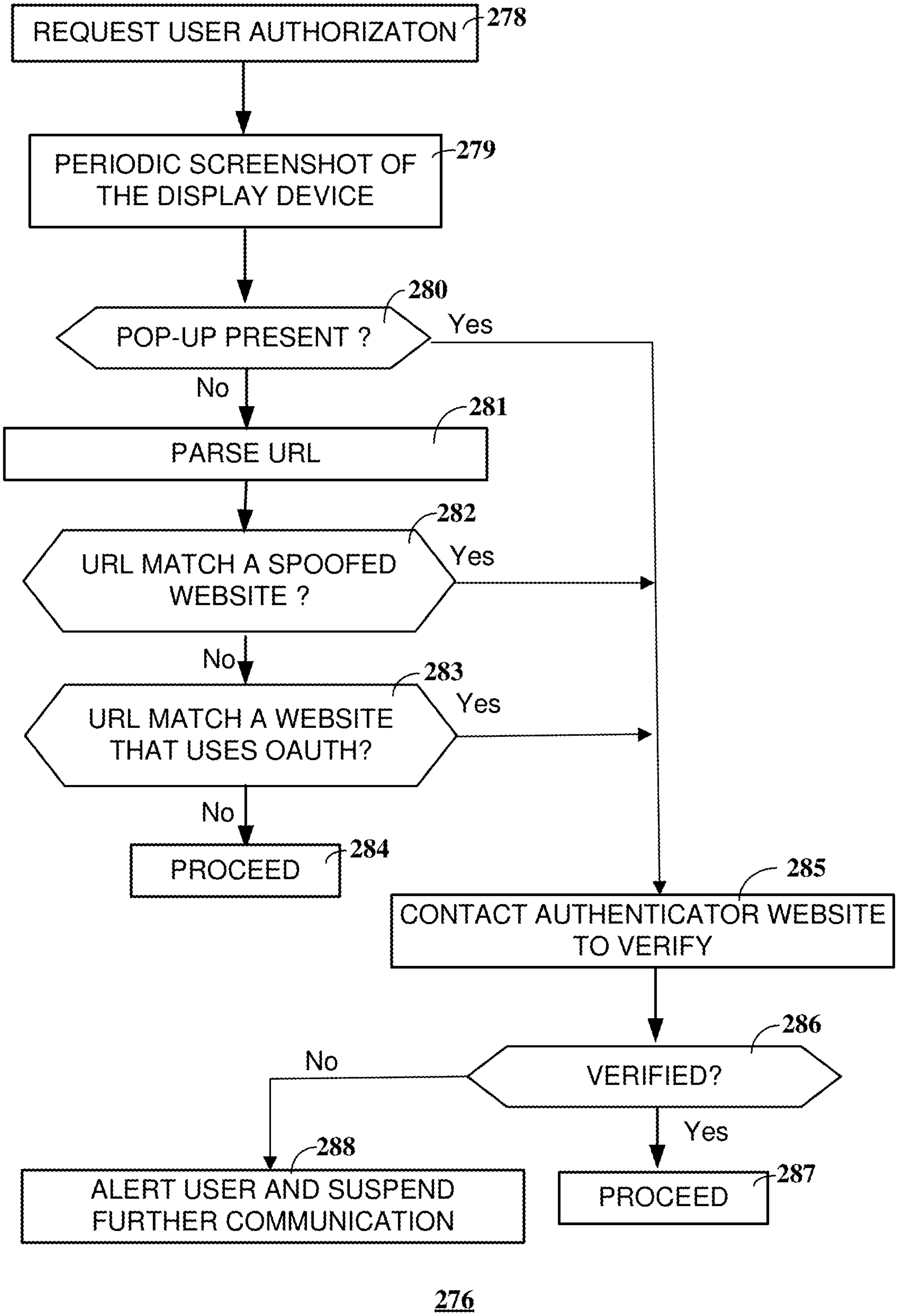
FIG. 2D depicts an illustrative embodiment of a method in accordance with various aspects described herein.

FIG. 2D depicts an illustrative embodiment of a method 276 in accordance with various aspects described herein. The method 276 may be termed a website connection verifier (WCV) and may be implemented in any suitable manner, such as in a software module operating on a data processing system such as a mobile device or laptop computer of a user. In embodiments, the method 276 operates as a background process generally not visible to the user. The user may become aware of operation of the method 276 if the method 276 detects suspicious activity occurring on the device of the user and alerts the user.

The method 276 may be used to detect and thwart a browser in the browser (BiTB) attack on a user and a user device. Such an attack may occur when the user attempts to use credentials from a known and trusted authenticator website such as Google or Facebook to activate or initialize an account with a new website or webpage. The user has an existing account with the authenticator website. In examples, the user credentials include credentials such as a unique email address associated with the user by the authenticator website and a confidential password known only to the user and the authenticator website.

The method 276 begins at step 278 in which the user is requested to authorize use of the method on the data processing system of the user and to authorize the use of confidential information of the user. A priority is placed on maintaining confidentiality of user information an only operating with user permission. For example, the WCV is committed to maintaining user privacy by configuring an artificial intelligence image parser to not store any personal information and not to capture sensitive fields such as passwords. If the user withholds permission or declines to authorize access to and use of user data, the method 276 ends.

At step 279, the WCV takes an occasional or periodic screenshot of the image displayed on the display device of the user device. This may be done with any preferred frequency or periodicity. Further, this may be done in response to any suitable trigger, such as communication of data to and from the user device.

Beginning at step 280, a number of processes are performed to determine if a browser in the browser attack has been conducted against the user and the user device. At step 280, an artificial intelligence module operating in the background on the user device determines if a pop-up is present. For example, the artificial intelligence module may analyze the data contained in the image or a screenshot of the display taken at step 279. The analysis may compare features of the screenshot image with known pop-ups used in conjunction with an OAuth process or an SSO process. If the image indicates presence of a pop-up, control proceeds to step 285.

At step 281, the method 276 includes a process of parsing the URL information determined in the screenshot image by the artificial intelligence module. For example, an address line in the web browser image may be identified and text contained in the address line analyzed to determine a URL or other network address associated with the pop up. The URL or other network address corresponds to a target website of the user. That is, the target website is the website or other network resource which the user desires to access and which has invoked eh OAuth or SSO process. The target website may be a legitimate website. The target website may be a spoofing website or other fraudulent website.

At step 282, the URL or other address information may be compared with contents of a database that stores address information for illegitimate websites. Illegitimate websites may include spoofed websites and other examples where the target or goal is fraudulent, and an attempt is made to deceive a user. A spoofed website may be a website or web page that appears to resemble a legitimate website or webpage. The legitimate website may be associated with a trusted brand used by consumers, for example. The goal of the spoofed website may be to lure a brand's customers, suppliers, and others to a fraudulent or unauthorized website and convince them to share sensitive or confidential information like login credentials and credit card information. In an example, the WCV parses only the URL and checks in its database to verify the spelling and compares the website URL to entries in the WCV's internal database for spoofed websites. A spoofed or other illegitimate website may use a confusingly similar URL such as chasse.com instead of chase.com, where chasse.com is a misspelling of the financial and banking website chase.com. Other deceptive practices may be used by the illegitimate website to deceive the user.

In embodiments, the contents of the internal database used by the WCV may be periodically updated, for example, by a provider of the WCV service. As the provider of the service discovers additional fraudulent usages among other clients for the service, that information may be used to keep the local database up to date. Further, the degree of match between a parsed URL and a database entry may be variable and may be controllable by the user. In one example, the WCV may require that the parsed URL from the screenshot precisely match a database entry, such as chasee.com. In another example, the WCV may merely require an 80% confidence level for a match, where the confidence level is determined in any suitable manner. An example is chasec-.com, where chasec.com does not precisely match the known spoof website chasee.com but may be considered suspicious. If the parsed URL from the screenshot appears to match a spoofed website, control proceeds to step 285.

At step 283, the method 276 determines if the parsed URL from the screenshot matches a website that is known to use the OAuth process. Similar to step 282, the WCV may compare the parsed URL with entries in a local database. The OAuth process is known to be vulnerable to browser inside browser attack. Further at step 283, if the parsed URL from the screenshot does correspond to a website that uses the OAuth process, the WCV analyzes the image from a screenshot to identify a pop-up used by the OAuth process. The WCV further verifies the authenticator website, such as Google or Facebook, that is used as part of the OAuth process when it is determined that the OAuth process is being used. If the URL matches a website that uses the OAuth process, control proceeds to step 285.

If the test of step 283 fails, control proceeds to step 284 and processing continues normally. The user device is free to contact third the third-party website and complete a registration process.

That step 285, the WCV operates to verify operation of the authenticator website being used by the user device. The authenticator website may be a website that is conventionally used to verify user accounts, such as Google, Facebook or Apple. Once the WCV determines that the user will use website_X (e.g., Google) as an authenticator, the WCV captures user credentials such as a username or email that the user will use to login to the authenticator website, website_X. The WCV contacts that authenticator website as a background operation on the user device and attempts to verify that an authentication request has been made. In effect, the WCV "Have you received an authentication request in the past few milliseconds for USER_123 to access website_yz?" where the user associated with the user device has a user identifier or email address of USER_123 and website_yz is the third party website sought to be accessed by the user, using the authenticator website.

At step 286, the WCV receives a verification response from the authenticator website. In the first example, the authentication website confirms that an authentication request has been made by the user device. In response to this affirmative response, at step 287, processing to access the third-party website proceeds as normal and the user is permitted to continue the registration process with the third-party website. On the other hand, if, at step 286, the authenticator website provided a response that indicated the user did not recently attempt an authentication, at step 288, the WCV alerts the user and suspends further communication with the third-party website. The WCV may conclude that a BiTB attack has occurred. This process to obstruct the BiTB attack may be overridden or bypassed by the user comma at user preference.

The process of step 285 may proceed in any suitable manner. For example, the WCV and the authenticator website may have a standardized set of queries and responses for verification. In an example, the amount of time specified in the query by the WCV, or "a few milliseconds," may be selectable by a user or automatically selectable by the WCV to accommodate network traffic levels, for example. Further, the authenticator website may provide a facility dedicated to the verification process illustrated by step 286, such as a dedicated URL to be accessed by the WCV. In an example, the WCV may use any convenient messaging protocol to contact the authenticator website. The messaging protocol may include some form of encryption of messages by the WCV and the authentication website The authentication verification operation of step 285 may be provided free of charge or at a cost to a provider of the WCV service, or according to any commercial terms agreed to by the parties.

Figure 2E:
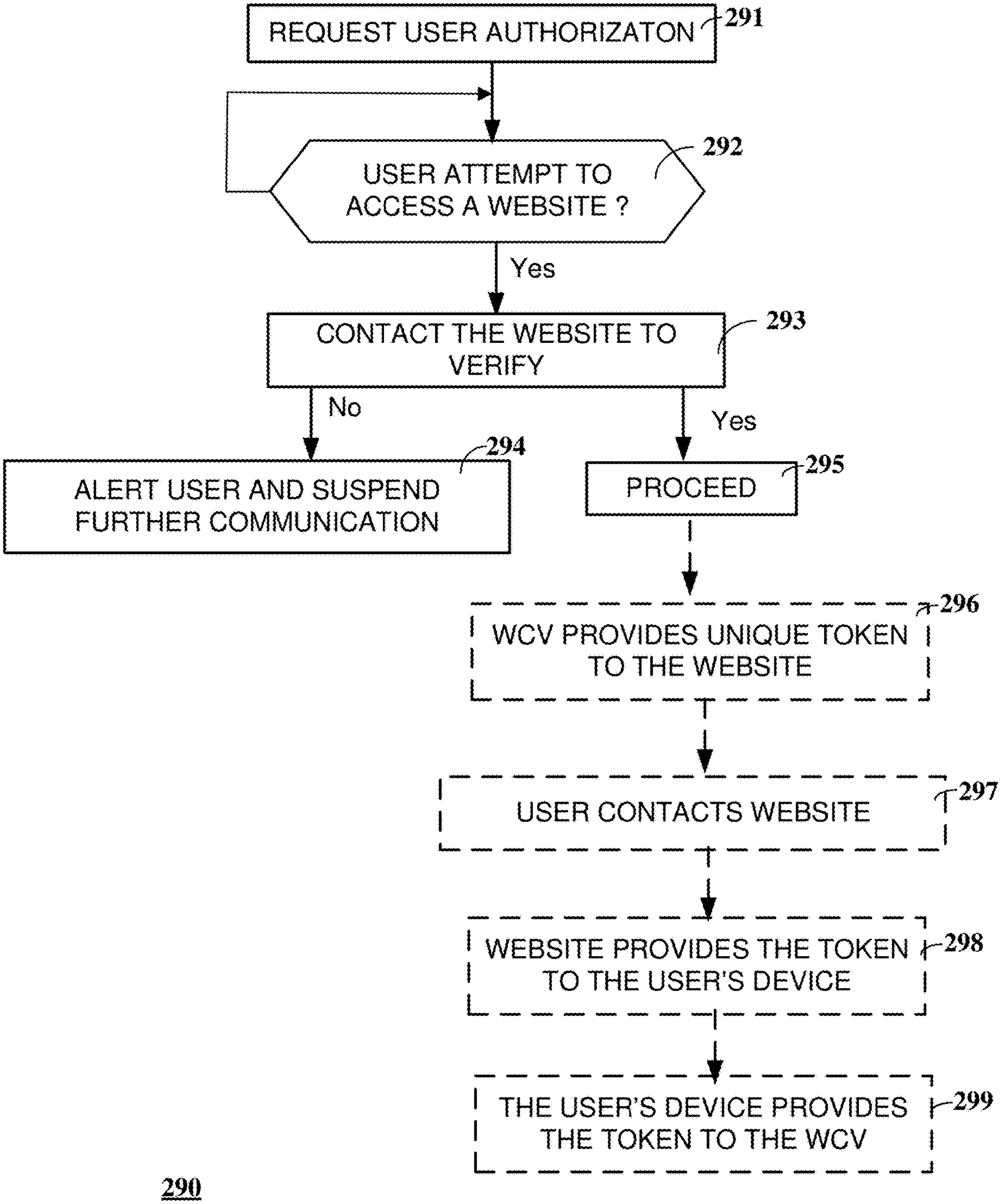
FIG. 2E depicts an illustrative embodiment of a method in accordance with various aspects described herein.

FIG. 2E depicts an illustrative embodiment of a method 290 in accordance with various aspects described herein. The method 290 may be termed a website connection verifier (WCV) similar to method 276 of FIG. 2D and may be implemented in any suitable manner, such as in a software module operating on a data processing system such as a mobile device or laptop computer of a user. In embodiments, the method 290 operates as a background process generally not visible to the user. The user may become aware of operation of the method 290 if the method 290 detects suspicious activity occurring on the device of the user and alerts the user.

The method 290 may be used to detect and thwart a phishing or spear phishing attack on the user or the user device. The user device may be any device capable of network communication such as a mobile device or laptop computer. A phishing is a type of attack used to steal user data including login credentials and credit card numbers. A phishing attack occurs when an attacker, masquerading as a trusted entity, dupes a victim into opening an email, instant message, or text message. The recipient is then tricked into clicking a malicious link which can lead to unfortunate consequences such as the installation of malware, the freezing of the user device as part of a ransomware attack or the revealing of sensitive information. Similarly, a spear phishing attack is an attempt to acquire sensitive information or access to a computer system by sending counterfeit messages that appear to be legitimate.

The method 290 begins at step 291, where the method 290 includes requesting user authorization. The request for user authorization may be a request to access user data and user communications with third party devices. If the user declines to authorize access by the method 290, the method 290 ends.

At step 292, control may operate in a loop including step 292 and including an operation to determine if a user is attempting to access a website using the user device. For example, a user attempt to access a website may be detected when the user types a URL into an address line on a web browser. Further, a user attempt to access a website may be detected when the user selects or clicks on a link contained in a message or on a web page displayed on the web browser. If no attempt is made to access a website, no further action is taken other than to continue monitoring user activity.

If, at step 292, it is determined that the user is attempting to access a website, at step 293 the method includes contacting the targeted website to verify the attempt to contact the targeted website. This process of step 293 may be similar to the process of step 285 discussed above in connection with FIG. 2D. For example, the WCV or other operation of the user device detects at step 292 that the user is trying to access a website having a URL of "goodwebsite.com". Then the WCV contacts the website goodwebsite.com to ask in effect, "is IP address (or username) trying to contact you?" In this example, the IP address is an internet protocol address or other unique network address or identifier associated with the user or the user device. Similarly, the username is uniquely associated with the user or user device.

At step 295, if the response from the website is favorable and confirms that the user device has contacted the website, the connection is allowed and processing proceeds normally. If the response from the website does not confirm the attempt to contact the website, the WCV disconnects the communication interface and advise the user.

This mechanism operates to verify that the user is actually reaching goodwebsite.com and is not getting redirected by, for example, a man-in-the-middle attack that diverts the traffic to a malicious website. For data privacy and confidentiality, the WCV does not have access to the content of the communications but merely is a second communications path to reach out to the server or website that the user is trying to reach.

FIG. 2E includes several optional steps shown in dashed lines. In some embodiments, at step 296, when the WCV contacts the website to verify legitimacy of the website, the WCV further provides a unique token to the website. The token may be any suitable data file or other information uniquely associated with the user and the website. At step 297, the user proceeds to contact the website as normal. At step 298, in response to the user contacting the website, the website provides the token received from the WCV at step 296 to the user device. Finally, at step 299, the user device provides the token to the WCV, closing the loop. This process thus operates like a two-factor authentication process.

In some embodiments, during step 297, step 298 and step 299, the method 290 may set a timer or otherwise measure the lapse of time from a time when the user device provides the token to the website. If the token is not received back from the website within a predetermined amount of time, such as 10 milliseconds of 1 second, the method 290 may suspend further communication with the website. That is, the WCV may conclude that because the token was not received from the website within the allotted time, the website was fraudulent or part of a phishing attempt on the user device. Suspending further communication, and advising the user, may prevent disclosure of user confidential information.

In some embodiments, the token provided at step 296 may include information of the user, such as the user's internet protocol (IP) or other network address, the user's username or email address, and other information. Further, in some embodiments, the token may be randomly generated by the method 290 or other source. The randomized token and user information are presented to the target website when the user contacts the target website in a foreground process. These additional steps may be more intrusive for the user by potentially disclosing confidential information of the user to the website, along with the token. However, including the user's information in this manner provides another measure of protection and assurance that the target website is a legitimate website. This may be valuable when used by sensitive applications on the web browser, such as financial applications client on the browser that exchanges confidential information of the user. When the user, using the browser, reaches the website, the website must provide the token to the client. In turn, the client must forward the token to the WCV or other process. If the WCV does not receive the token from the client within a predetermined amount of time, such as 500 ms, the WCV suspends further communications with the website.

Any suitable communication protocol or messaging operation may be standardized to enable communication between the WCV, a website and a user device. The communication and messaging may be part of a standardized service offered by a data security provider. Optional functional features may be provided as well.

In some embodiments of method 276 and method 290, the method may include a feature of monitoring traffic communicated between a pop-up on the user device and external devices. The content of the traffic does not need to be monitored, just the amount of traffic, measured in packets or kilobytes, etc. For example, if a pop-up displayed on the browser of the user device generates ten packets of data, the communication of traffic from the user device may be measured to ensure that 10 packets of data go to the authenticator website, such as Google or Facebook. Further, the authenticator website should confirm that 10 packets of data have been received, not more and not less. If more data is communicated than the pop-up generates, there is a risk of a data breach. For example, if the pop-up generates 100 packets, communicates 10 packets to the authenticator website and stores the remaining 90 packets on the memory of the user device, those stored packets may have an unauthorized purpose such as a phishing attack on the user device. Similarly, if the pop-up generates 100 packets and communicates all 100 packets from the user device but only communicates 10 to the authenticator website as reported by the authenticator website, there may be a data leak through the pop-up. If the amount of data communicated to an external device or to an internal memory location of the user device exceeds a threshold, the method 276 and the method 290 may interrupt further processing and communication by the pop-up and notify the user of the potential data leak.

While for purposes of simplicity of explanation, the respective processes are shown and described as a series of blocks in FIG. 2D and FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
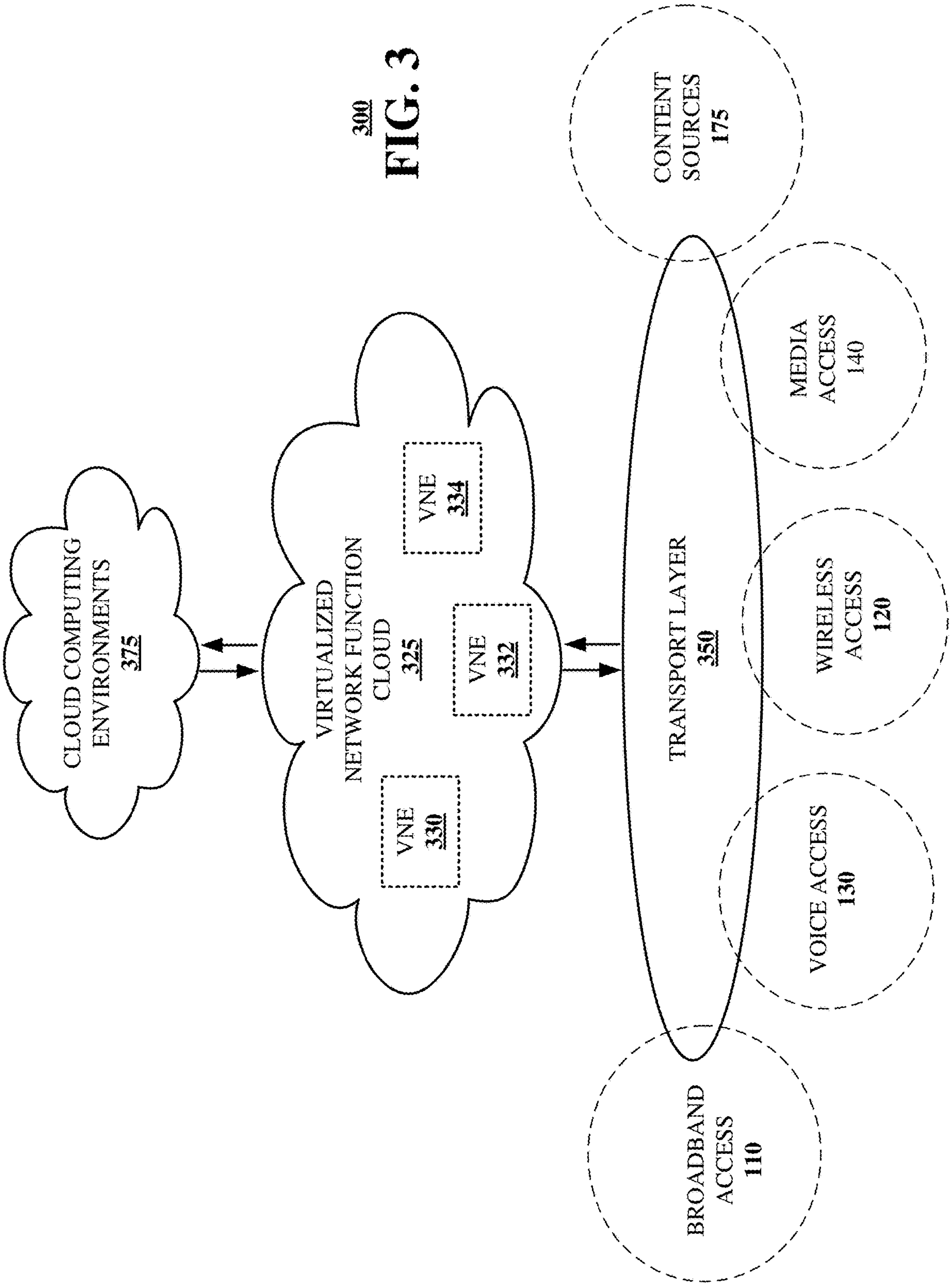
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIG. 1, FIG. 2A, FIG. 2B, FIG. 2C, FIG. 2D, FIGS. 2E and 3. For example, virtualized communication network 300 can facilitate in whole or in part verifying legitimacy of a website or webpage in a background process as a user device attempts to interact with the website or webpage.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs

330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
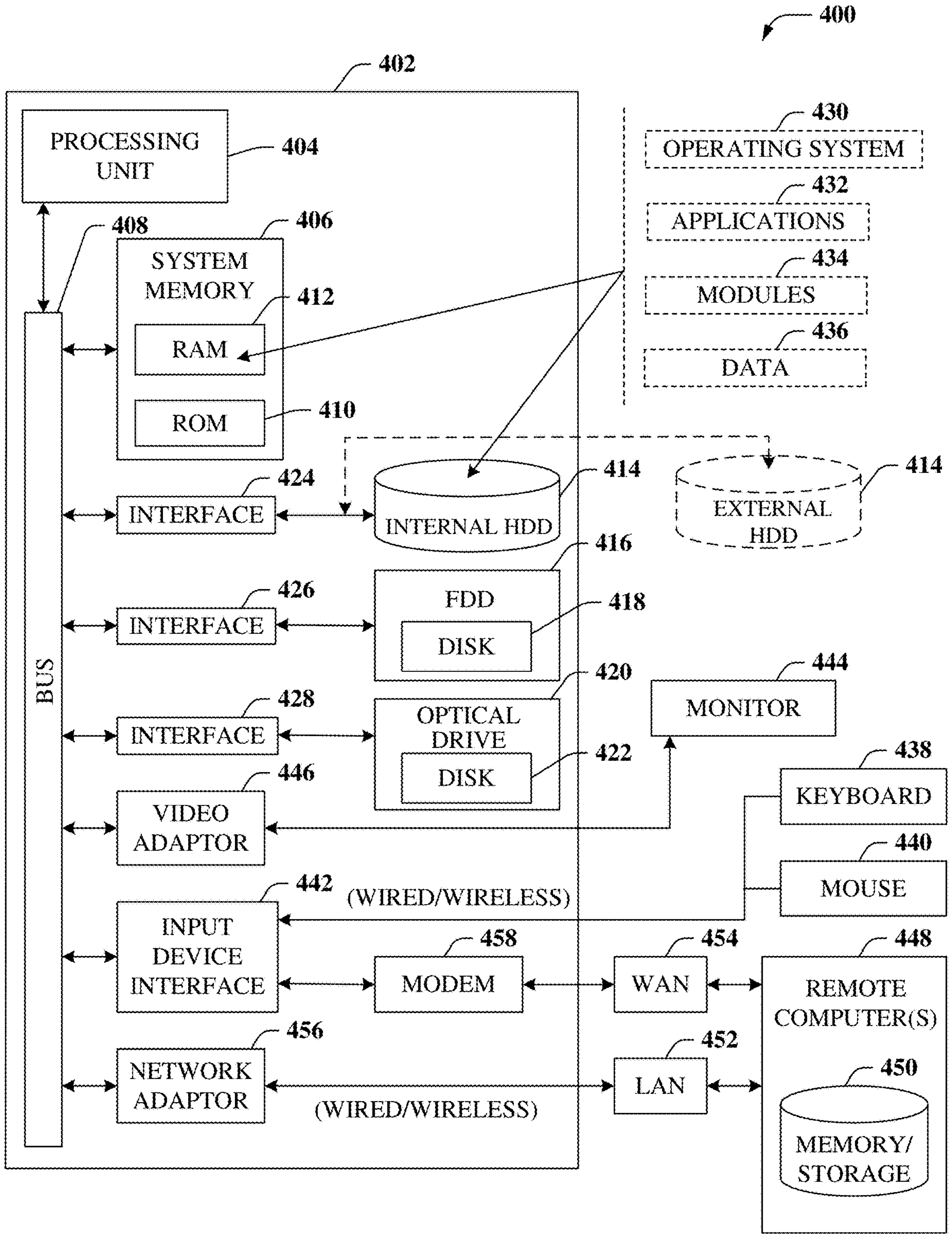
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part verifying legitimacy of a website or webpage in a background process as a user device incorporating aspects of the computing environment 400 attempts to interact with the website or webpage.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM

410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
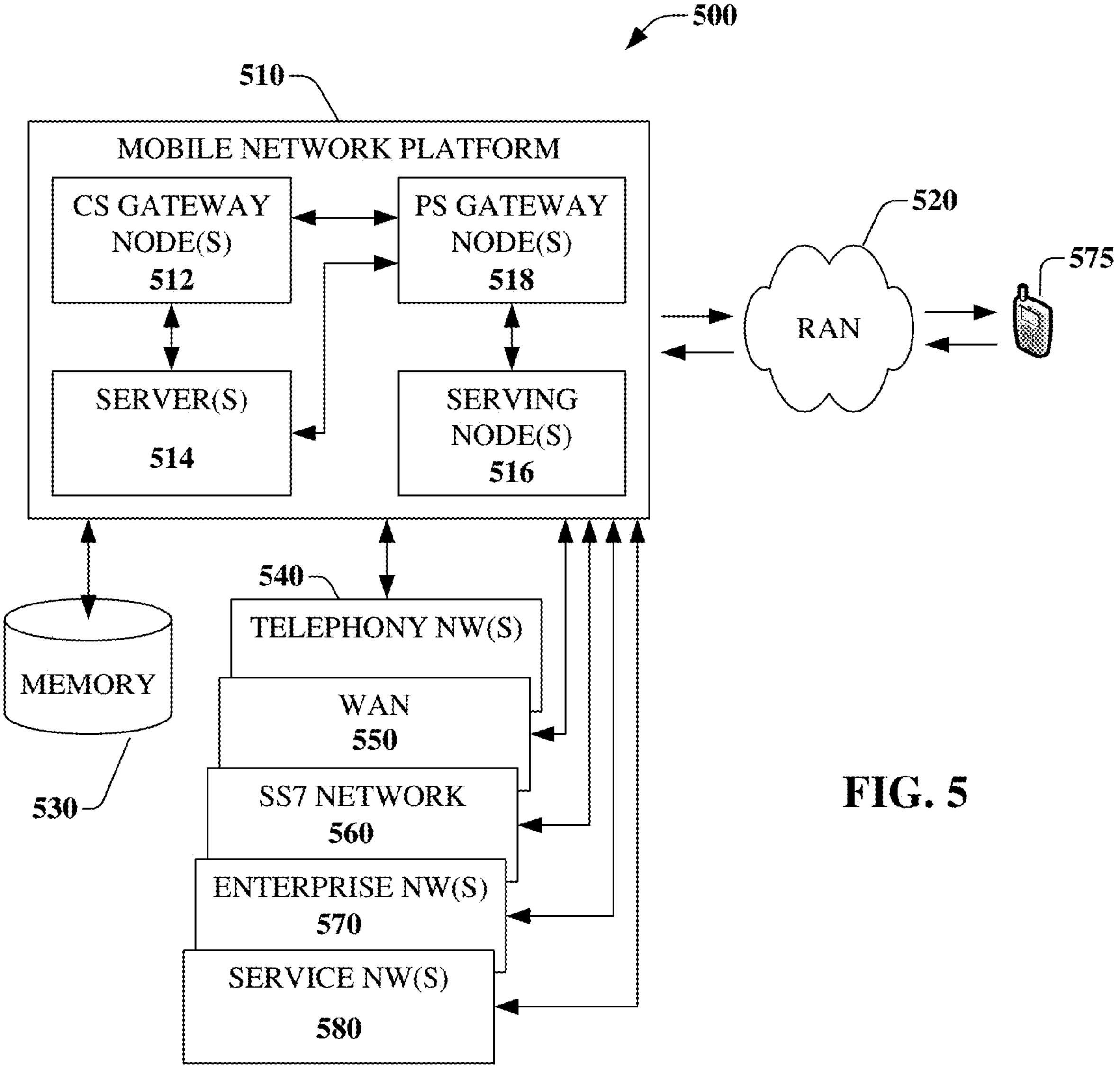
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part verifying legitimacy of a website or webpage in a background process as a user device such as a mobile device or smartphone attempts to interact with the website or webpage. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
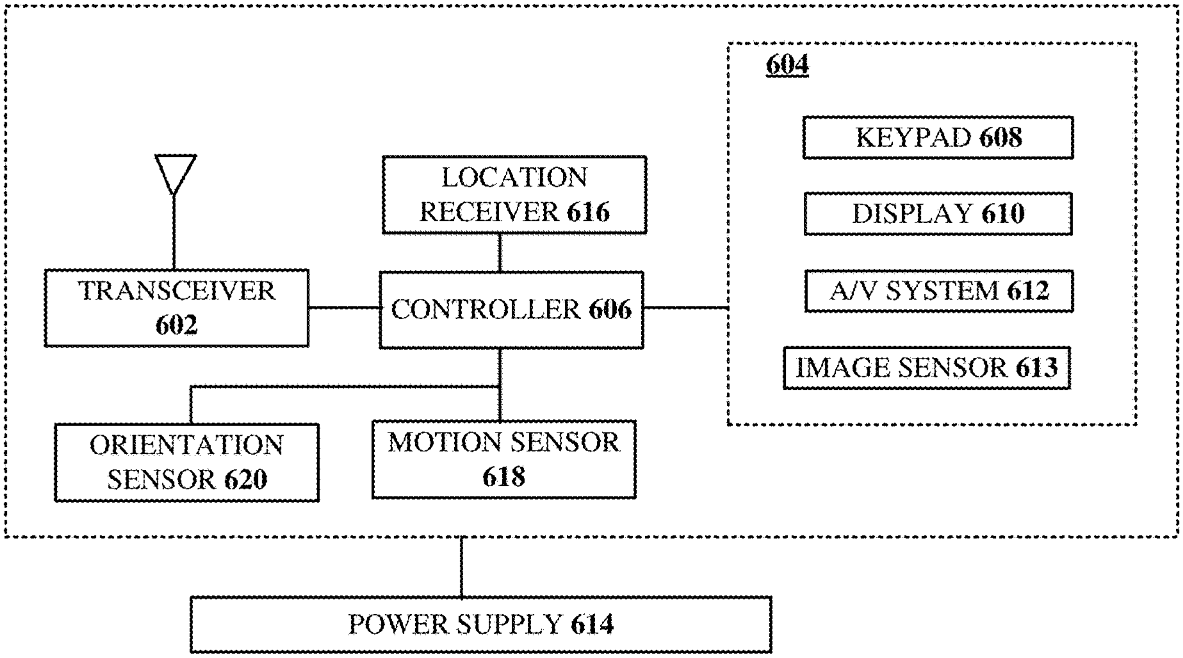
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part verifying legitimacy of a website or webpage in a background process as a user device employing aspects of the communication device attempts to interact with the website or webpage.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth©, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence}(\text{class})$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

capturing an image of information displayed on a display screen of the device, wherein the capturing is initiated in response to detecting that data is being transmitted or received via a communications interface of the device over a network, and wherein communications between a web browser of the device and the network are encrypted, preventing applications outside of the web browser from reading a uniform resource locator (URL), network address, or destination identifier for the network;

identifying in the image a pop-up, the pop-up prompting entry of user credentials of a user for an authenticator website, the pop-up generating an authorization request from the device to the authenticator website;

identifying from the pop-up, the authorization request from an authenticator website;

responsive to the identifying the authorization request in the pop-up, applying image recognition to identify the authenticator website displayed in the pop-up, wherein the image recognition includes using an artificial intelligence module to compare features of the image with known pop-ups used in conjunction with an OAuth process or an SSO process and to detect a browser-in-the-browser (BiTB) attack based on characteristics of the pop-up, wherein the applying image recognition comprises analyzing (i) the pop-up and (ii) a displayed address line of the web browser, without analyzing contents of other portions of the image captured from the display screen of the device;

associating the authenticator website with a database of verified network addresses;

identifying in the image a network address for a target website; and communicating with the authenticator website at a verified network address selected from the database for verification of the authorization request, wherein the communicating is via a second communications path and excludes access to content of communications between the web browser and the network.

2. The device of claim 1, wherein the operations further comprise:

comparing the network address with a list of known illegitimate websites; and initiating a verification communication with the authenticator website in response to a match between the network address and a known illegitimate website.

3. The device of claim 2, wherein the comparing the network address with a list of known illegitimate websites comprises:

comparing the network address with misspelled uniform resource locators for one or more websites.

4. The device of claim 1, wherein the operations further comprise:

comparing the network address with a list of websites that use delegated authentication for controlled access to a website; and initiating a verification communication with the authenticator website in response to a match between the network address and a website known to use delegated authentication.

5. The device of claim 4, wherein the comparing the network address with a list of websites that use delegated authentication comprises:

retrieving a list of websites known to use OAuth verification process; and comparing the network address with the list of websites known to use OAuth verification process.

6. The device of claim 5, wherein the operations further comprise:

analyzing the image of information displayed on the display screen of the device to identify a pop-up associated with the OAuth verification process; and identifying, in the image of information displayed on the display screen of the device, a network address associated with an authenticator website associated with the OAuth verification process.

7. The device of claim 1, wherein the communicating with the authenticator website comprises:

capturing user credentials to be used on behalf of the user to access the authenticator website; and communicating to the authenticator website a query regarding the authorization request, the query regarding the authorization request inquiring if the authorization request has been received by the authenticator website.

8. The device of claim 7, wherein the operations further comprise:

receiving, from the authenticator website, confirmation that the authorization request has been received by the authenticator website; and permitting access to the target website based on the confirmation that the authorization request has been received.

9. The device of claim 7, wherein the operations further comprise:

receiving, from the authenticator website, an indication that no authentication request has been received by the authenticator website; and blocking access to the target website based on the indication that no authentication request has been received.

10. The device of claim 9, wherein the operations further comprise:

alerting the user, wherein the alerting is based on the indication that no authentication request has been received.

11. A non-transitory machine-readable medium, comprising executable instructions that, when executed by a processing system including a processor, facilitate performance of operations, the operations comprising:

from time to time, in a background process of the processing system, capturing a screenshot of an image displayed by a web browser on a display screen of a user device, wherein the capturing is initiated in response to detecting that data is being transmitted or received via a communications interface of the user device over a network, and wherein communications between the web browser and the network are encrypted, preventing applications outside of the web browser from reading a uniform resource locator (URL), network address, or destination identifier for the network;

in the background process, identifying in the screenshot a pop-up, the pop-up prompting entry of user credentials of a user for an authenticator website, the pop-up generating an authorization request from the user device to the authenticator website;

in the background process, identifying from the pop-up the authorization request from the authenticator website;

in the background process, responsive to the identifying the authorization request in the pop-up, applying image recognition to identify the authenticator website displayed in the pop-up, wherein the image recognition includes using an artificial intelligence module to compare features of the image with known pop-ups used in conjunction with an OAuth process or an SSO process and to detect a browser-in-the-browser (BiTB) attack based on characteristics of the pop-up, wherein the applying image recognition comprises analyzing (i) the pop-up and (ii) a displayed address line of the web browser, without analyzing contents of other portions of the image captured from the display screen of the device;

in the background process, associating the authenticator website with a database of verified network addresses;

in the background process, analyzing the screenshot of the image to identify a network address for a target website to be accessed by the web browser;

in the background process, identifying an authenticator website from the database of verified network addresses to be used to provide access credentials for access to the target website by the web browser; and in the background process, communicating with the authenticator website at a verified network address to verify an authentication request, the authentication request seeking authentication in a foreground process of the processing system to access the target website, wherein the communicating is via a second communications path and excludes access to content of communications between the web browser and the network.

12. The non-transitory machine-readable medium of claim 11, wherein the operations further comprise:

in the background process, communicating to the authenticator website a query regarding the authentication request, the query regarding the authentication request inquiring if the authentication request has been received by the authenticator website;

in the background process, receiving from the authenticator website, confirmation that the authentication request has been received by the authenticator website; and in the background process, permitting access in the foreground process to the target website based on the confirmation that the authentication request has been received.

13. The non-transitory machine-readable medium of claim 11, wherein the operations further comprise:

in the background process, communicating to the authenticator website a query regarding the authentication request, the query regarding the authentication request inquiring if the authentication request has been received by the authenticator website;

in the background process, receiving from the authenticator website, an indication that no authentication request has been received by the authenticator website; and blocking access in the foreground process to the target website based on the indication that no authentication request has been received.

14. The non-transitory machine-readable medium of claim 11, wherein the operations further comprise:

in the background process, analyzing the screenshot of the image to identify a pop-up browser displayed in the web browser on the display screen of the user device, the pop-up browser including in the foreground process a prompt for entry by a user of user credentials for the authenticator website, the pop-up browser generating the authentication request to the authenticator website.

15. The non-transitory machine-readable medium of claim 14, wherein the operations further comprise:

monitoring, in the background process, a first amount of data communicated between the pop-up browser and an external device;

monitoring, in the background process, a second amount of data communicated between the pop-up browser and a memory of the user device;

comparing, in the background process, the first amount of data with a first threshold, producing a first comparison;

comparing, in the background process, the second amount of data with a second threshold, producing a second comparison; and suspending operation of the pop-up browser based on the first comparison and the second comparison.

16. A method, comprising:

identifying, by a processing system including a processor of a device, an attempt by a web browser operating on the processing system to interact with a website over a network, wherein the attempt to interact with the website over the network is based on a prompt from a pop-up, the pop-up prompting entry of user credentials of a user for the website, the pop-up generating an authorization request from the web browser to the website, and wherein communications between the web browser and the network are encrypted, preventing applications outside of the web browser from reading a uniform resource locator (URL), network address, or destination identifier for the network;

identifying, by a background process of the processing system, from the pop-up the authorization request from a website;

responsive to the identifying the authorization request in the pop-up, applying, by the background process of the processing system, image recognition to identify the website identified in the pop-up, wherein the image recognition includes using an artificial intelligence module to compare features of the image with known pop-ups used in conjunction with an OAuth process or an SSO process and to detect a browser-in-the-browser (BiTB) attack based on characteristics of the pop-up, wherein the applying image recognition comprises analyzing (i) the pop-up and (ii) a displayed address line of the web browser, without analyzing contents of other portions of the image captured from a display screen of the device;

associating, by the background process of the processing system, the website with a database of verified website network addresses;

communicating with the website at a verified network address selected from the database, by the background process of the processing system, wherein the communicating comprises inquiring if the website has received the attempt by the web browser to interact with the website, wherein the inquiring is based on a network address of the web browser for the website, wherein the communicating is via a second communications path and excludes access to content of communications between the web browser and the network; and receiving, by the background process of the processing system, an indication from the website confirming that the website has received the attempt by the web browser to interact with the website.

17. The method of claim 16, wherein the communicating with the website comprises:

providing, by the background process of the processing system, a unique token to the website; and receiving, by a foreground process of the processing system, the unique token from the website, wherein the receiving the unique token is responsive to attempt by the web browser to interact with the website.

18. The method of claim 17, comprising:

receiving, by background process of the processing system, the unique token from the foreground process of the processing system; and verifying, by the background process of the processing system, that the foreground process of the processing system is communicating with website.

19. The method of claim 17, comprising:

determining, by the background process of the processing system, that the unique token has not been received from the website within a predetermined amount of time; and suspending, by the background process of the processing system, further communication with the website by the foreground process of the processing system to prevent disclosure of confidential information.

20. The method of claim 16, comprising:

capturing, by the processing system, a screenshot of an image displayed by the web browser on a display screen of a device including the processing system;

analyzing, by the processing system, in the artificial intelligence module, the screenshot of the image to identify a network address of the website, forming an identified uniform resource locator (URL); and communicating, by the processing system, with the website at the identified URL.

* * * * *